1,522,809

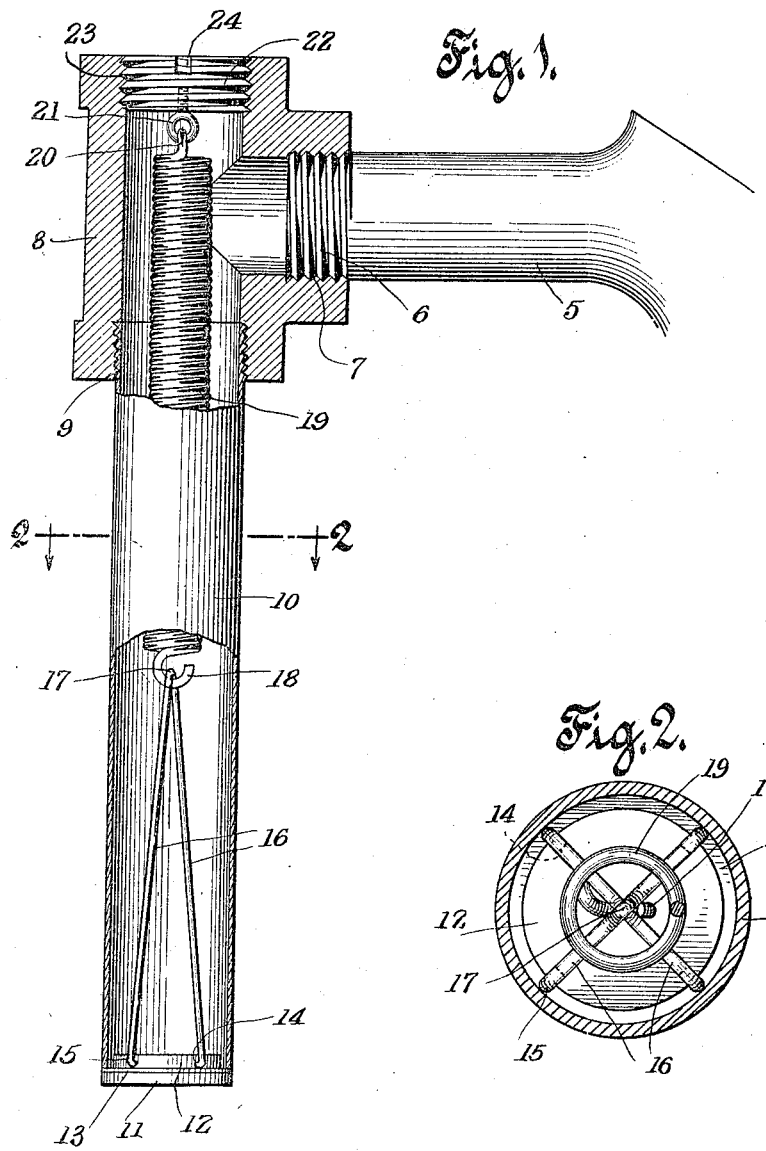
Jan. 13, 1925.
W. C. COLLINS
SELF CLOSING NOZZLE
Filed April 24, 1923
1,522,809
INVENTOR
Walter C. Collins Patented Jan. 13, 1925.

UNITED STATES PATENT OFFICE.

WALTER C. COLLINS, OF HAVERHILL, MASSACHUSETTS, ASSIGNOR OF ONE-HALF TO HARRY FURLONG, OF HAVERHILL, MASSACHUSETTS.

SELF-CLOSING NOZZLE.

Application filed April 24, 1923. Serial No. 634,236.

*To all whom it may concern:*

Be it known that I, WALTER C. COLLINS, a citizen of United States, residing at Haverhill, in the county of Essex and State of Massachusetts, have invented certain new and useful Improvements in Self-Closing Nozzles, of which the following is a specification.

This invention relates to devices for closing the discharge end of supply pipes coincidently with cutting off the flow therethrough, and has special application to such pipes as are used in dispensing gasoline from service stations to cars in which the gasoline will be used.

The main object of the invention is to provide means for automatically closing the end of the pipe as soon as the pressure is released, thus avoiding leakage and loss of material.

Another purpose is to produce an attachment that can be readily applied to the ends of such service pipes without change thereto.

These several aims and objects are accomplished by the novel and simple construction and combination of parts hereinafter described and shown in the accompanying drawing, forming part of this disclosure, and in which:—

Figure 1 is a partial side, partial sectional view of an embodiment of the invention, showing its application.

Figure 2 is a transverse sectional view taken on line 2—2 of Figure 1, and drawn to an enlarged scale.

In the drawing the numeral 5 is used to designate the discharge nozzle of a conventional type of flexible gasoline hose (not shown), the nozzle being screw-threaded at its end 6 to engage in the side opening 7 of a common T fitting 8.

In one of the through openings 9 of the T is fixedly secured a tube 10 extending a convenient distance outward and having at its opposite end a valve disc 11 formed with a reduced circular extension 12 acting as a guide for a pliable washer 13 made of rubber or like material adapted to make an impervious closure for the end of the tube when pressed against it by the disc 11.

The extension 12 is of smaller diameter than the pipe and contains a plurality of radial openings 14 suited to receive the hook ends 15 of wires 16 convergingly bent to the loops 17 engaged in an eye 18.

Said eye is formed by suitably bending one of the outer coils of a helically wound tension spring 19 having a similar eye 20 at its opposite end engaged in an eye 21 fixed centrally in the bottom of a plug 22 screw-threaded into the other through end 23 of the T 8, the plug having a slot 24 by which it can be adjusted.

In operation, when the pump or head supplying pressure to the gasoline is operated, current is forced through the nozzle 5, into the T and thence into the tube 10, displacing the valve disc, thus allowing the gasoline to be discharged as usual.

When the pressure on the gasoline is relaxed the valve disc is forcibly drawn against the end of the tube, the washer 13 being compressed by the pull of the spring 19 effectually closing the end of the tube, which, together with the hose connection, may contain a considerable quantity of gasoline that would otherwise become wasted besides fouling the premises.

From the foregoing it will be seen that a simple, inexpensive attachment to an ordinary service station hose has been disclosed that effectually performs the objects before set forth.

It is to be understood however that minor changes may be made within the structure as presented that would fall within the scope of the appended claims and not involve inventive genius.

Having thus described my invention and set forth the manner of its construction, application and use, what I claim as new and desire to secure by Letters Patent, is:—

1. A supply pipe closure comprising in combination with the supply pipe, a tube communicating with said pipe at an angle, an adjustable plug fixed in one end of said tube, a disc valve controlling the other end of said tube, a reduced circular extension on said disc valve provided with a plurality of radial openings, a pliable washer guided by said extension, a spring in said tube fixed at its respective ends in said disc valve and said plug wires adapted to engage with their hooked ends in the radial openings of said extension and connected with said spring, the tension of said spring being adapted to close said valve upon the reduction of pressure in said pipe.

2. A supply pipe closure comprising in combination with the supply pipe, a tube into which said supply pipe enters, an adjustable plug for closing one end of said tube, a valve at the other end of said tube, resilient means for closing said valve upon the reduction of pressure in said tube looped elements for engaging said valve and connected to said resilient means.

3. A supply pipe closure comprising in combination with the supply pipe, a T having its side opening engaged with said pipe, a plug in one of the through openings in said T, a tube fixed at one end in the other opening, a disc valve having a pliable washer adapted to close the other end of said tube, looped elements engaging said valve and extending into said tube, a pull spring connected with said looped elements, and an eye in said plug engaging the other end of said spring, the tension of said spring being adapted to close said valve upon the reduction of pressure in said pipe.

In witness whereof I have affixed my signature.

WALTER C. COLLINS.